Feb. 22, 1938.                D. W. SESSIONS                2,109,238
HYDRAULIC JACKING SYSTEM FOR VEHICLES
Filed Nov. 19, 1935            2 Sheets-Sheet 1
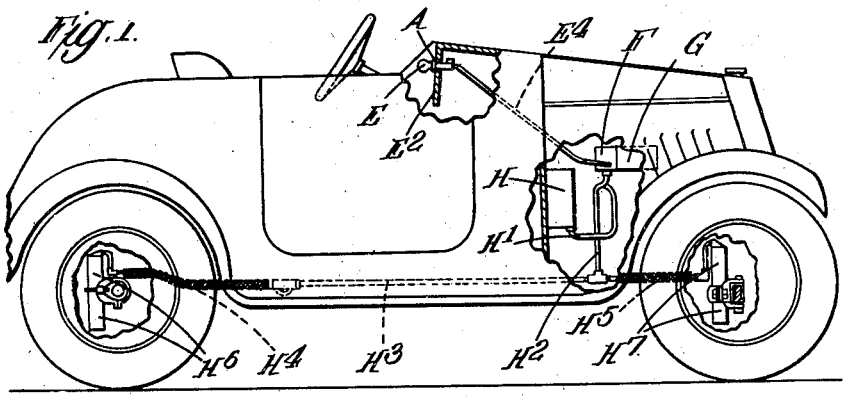
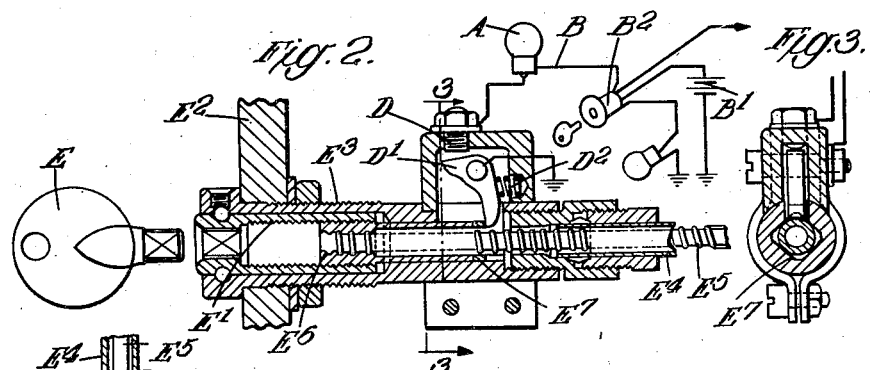
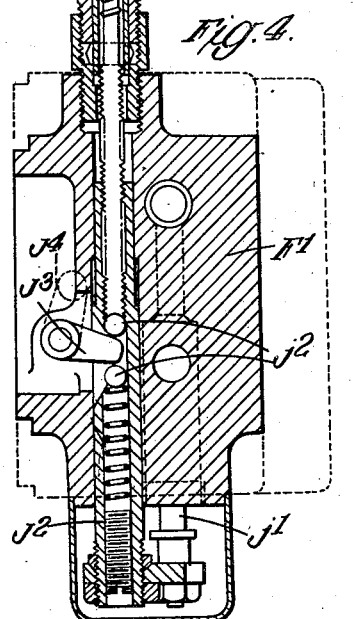
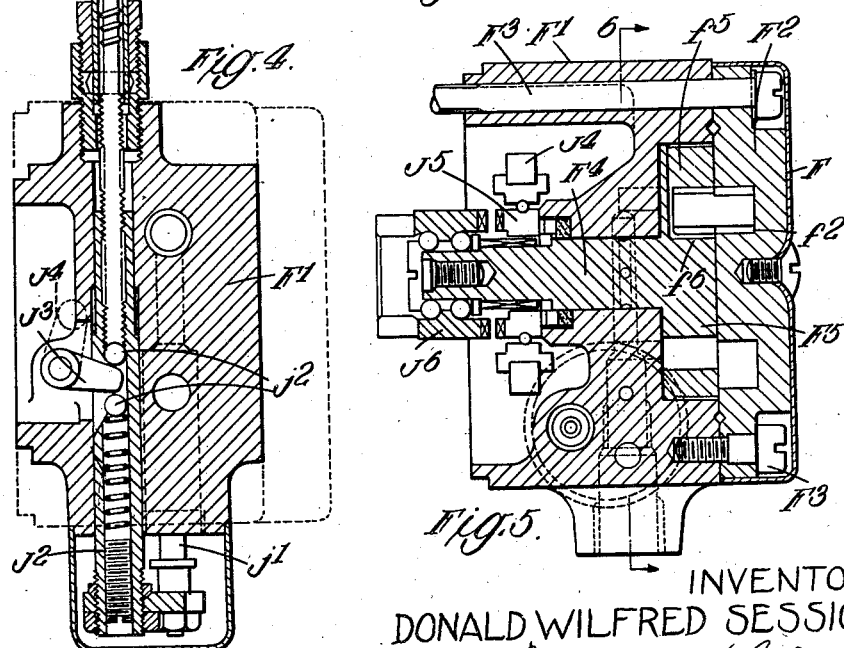
INVENTOR:
DONALD WILFRED SESSIONS
BY Haseltine, Lake & Co.
ATTORNEYS

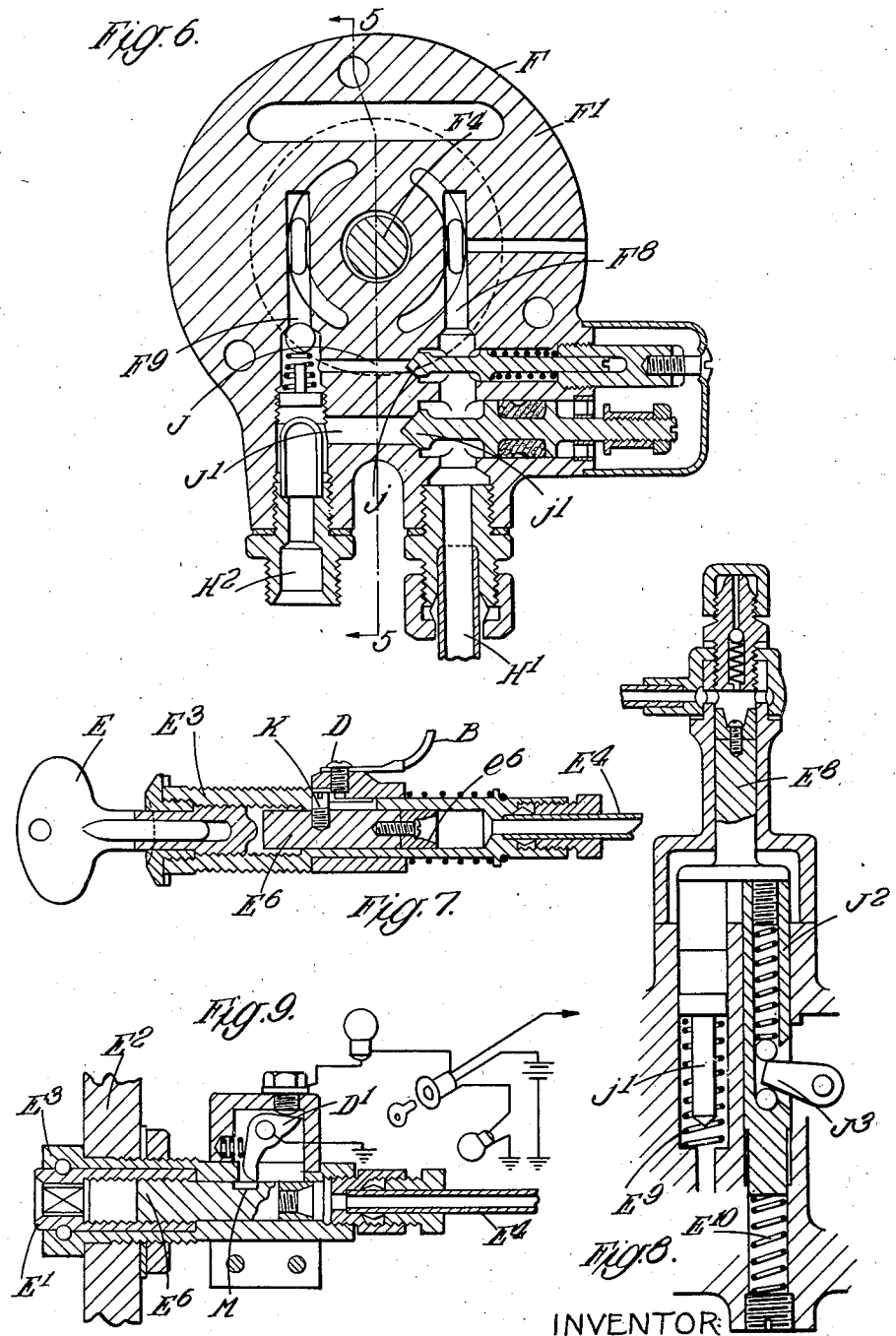

Patented Feb. 22, 1938

2,109,238

UNITED STATES PATENT OFFICE 2,109,238

HYDRAULIC JACKING SYSTEM FOR VEHICLES

Donald Wilfred Sessions, Willesden, London, England

Application November 19, 1935, Serial No. 50,530
In Great Britain October 16, 1935

8 Claims. (Cl. 60—52)

This invention relates to hydraulic jacking systems for vehicles and its main object is to provide means for warning the driver when the jacks are in operation and a further object is to minimize the possibility of the warning device remaining in action when the vehicle is not in use.

In order that the invention may be clearly understood and readily carried into effect the same will now be described more fully with reference to the accompanying drawings in which:—

Figure 1 is a diagrammatic illustration of a motor-car having applied thereto a jacking system made in accordance with the invention;

Figure 2 is a sectional view of that part of the jacking system control device which is adjacent to the dashboard of the vehicle and illustrates a warning device made in accordance with the invention;

Figure 3 is a sectional view on the line 3—3 of Figure 2;

Figure 4 is a sectional view of that part of the jacking system control device that is located adjacent to a pump comprised in the system;

Figure 5 is a sectional view of the said pump on the line 5—5 of Figure 6;

Figure 6 is a sectional view of the pump and part of the control devices on the line 6—6 of Figure 5;

Figure 7 is a view similar to Figure 2 but illustrating a modified arrangement;

Figure 8 is a view similar to Figure 4 but illustrating a modified arrangement adapted for use with the arrangement shown in Figure 7; and Figure 9 is a view similar to Figures 2 and 7 but illustrating a further modification.

The required warning to the driver is given by means of an electric light bulb A arranged on the dashboard or in some other convenient position. The lamp A is arranged in an electric circuit B which includes the vehicle batteries $B^1$ and the usual engine ignition switch $B^2$. The circuit is thus made or broken by the engine switch $B^2$ and also by a make and break device comprising a contact screw D and a two-armed lever $D^1$, one arm of which is adapted to contact with the screw D by pressure of a spring $D^2$ acting on the other arm, which other arm can be moved positively to break the circuit by connection to the means which the driver actuates for extending or collapsing the jacks.

In the arrangement shown in Figures 1 and 2 the driver fits a detachable key E in a socket $E^1$ mounted on the dashboard $E^2$ and rotates the socket. This socket is rotatably mounted by a ball bearing in an outer barrel $E^3$ which is connected at its rear end to a tube $E^4$ which tube contains a push and pull cable $E^5$. The socket is internally screw-threaded to receive a threaded member $E^6$ which can move axially but is held against rotation by a square head $E^7$. This movable member is connected to the push and pull cable $E^5$. The two armed lever $D^1$ is pivotally mounted in a small housing $D^4$ on the barrel $E^3$ and one arm of this lever extends through a slot or slots into the path of the square head $E^7$. The other end of the cable $E^5$ is connected to means for controlling the driving and stopping of a pump F which supplies fluid pressure to the lifting jacks and also is connected to a valve for releasing the fluid pressure supplied to the jacks. The pump F is mounted on the vehicle in a suitable position according to the part from which it is to be driven. In Figure 1 the pump is shown attached to a dynamo G to which it can be coupled. The pump draws oil from a reservoir H through a pipe $H^1$ and forces the oil through a discharge pipe $H^2$ into a horizontal pipe line $H^3$ and flexible tubes $H^4$, $H^5$, to a pair of hydraulically operated jacks $H^6$ permanently attached to the rear axle and to a pair of hydraulically operated jacks $H^7$ permanently attached to the front axle. The pump comprises a casting or body $F^1$ and a cap $F^2$ held on to the body by bolts $F^3$ some of which bolts also serve for attaching the pump to the dynamo or other appropriate drive. Mounted about centrally in the pump body $F^1$ is a pump spindle $F^4$ that carries a rotor $F^5$. The cap $F^2$ has an annular recess therein located eccentrically with respect to the axis of the spindle $F^4$. The annular pistons comprise three piston blocks $f^2$ located in said recess and carrying rollers $f^6$ that are engaged in the radial slots $f^5$. This arrangement is similar to that described in the specification of Patent No. 1,997,233. When the spindle $F^4$ is rotated the piston blocks $f^2$ rotate and move apart and together alternately and draw oil into the spaces between them from the inlet passage $F^8$ and expel this oil to the outlet passage $F^9$ in the pump body $A^1$. In the pump body are two conduits J, $J^1$, controlled respectively by a safety valve $j$ and a release valve $j^1$. The valve $j^1$ (see Figure 4) is connected to a tube $J^2$ to which the cable $E^5$ is attached. The tube $J^2$ carries two balls $j^2$ which engage an arm $J^3$ of a yoke $J^4$. The yoke $J^4$ operates a clutch member $J^5$ which is splined on to the spindle $F^4$. The spindle $F^4$ rotatably carries a co-operating clutch member $J^6$ which is secured to the magneto drive or other driven element. Thus operation of the cable $E^5$ in one direction will close the valve j¹ and at the same time engage the clutch members J⁵, J⁶, so that the pump is driven and all of the jacks are extended and at the same time the circuit B is completed through the contacts D, D¹, and the lamp A will give the required warning to the driver. The circuit B will be broken either by turning the engine switch off or by rotating the key sufficiently in the opposite direction to uncouple the pump from the driving member. If, for instance, the jacks are extended and the vehicle is left overnight the engine switch will be off and the lamp therefore will not be using the vehicle batteries, but when the engine switch is turned on in the morning the lamp circuit will be completed and will warn the driver that the jacks are extended.

Instead of employing a push and pull cable E⁵ the tube E⁴ may contain a column of fluid and the arrangement shown in Figures 7 and 8 may then be employed. Referring to Figure 7, the movable member E⁶ is in the form of a piston having a rubber washer e⁶ attached to it. The key E in this arrangement has a screw-threaded connection with the barrel E³ so that as the key is rotated it moves axially along the barrel and pushes the piston E⁶ which in turn pushes the column of liquid in the tube E⁴. This column of fluid acts upon a second piston E⁶ (Figure 8) which is connected to the tube J² and valve j¹, springs E⁹, E¹⁰, being provided for returning the column of liquid and parts referred to to their normal positions when the key E is retracted. For making and breaking the circuit B the piston E⁶ carries a terminal K adapted to move into and out of engagement with the terminal B. The terminal K serves as a limiting stop for the piston E⁶ and the housing is spring mounted so that the terminal K continues to move to the right (Figure 7) after it meets the terminal D, and so that on the return movement the housing is brought to rest and the terminal K then moves further to break the electric circuit. Allowance should of course be made in the spacing of the clutch members or otherwise for expansion of the column of fluid.

In the modification shown in Figure 9 the piston E⁶ has a recess M therein which is engaged by the two-armed lever D¹, and the piston E⁶ has a screw-threaded engagement with the socket E¹ which is rotatable in the barrel E³. If the controlled devices are arranged adjacent to the pump instead of connected with the dashboard the circuit B may extend to the dashboard.

What I claim and desire to secure by Letters Patent of the United States is:—

1. In a hydraulic jacking system for a motor vehicle and in combination, hydraulic jacks secured beneath the vehicle, a reservoir for containing a liquid for operating said jacks, a pump operable to draw liquid from said reservoir and to deliver the same to said jacks under pressure to actuate said jacks, a valve variously operable when said pump is at rest to prevent the return of liquid delivered by the pump and to by-pass the delivered liquid back into the reservoir to release said jacks, a clutch operable to connect the pump to the engine drive, an electrical signal for indicating when the pump is clutched to the engine drive, a circuit for said signal prepared in part by the closure of the engine ignition circuit, and manually controlled means for operating said clutch, closing said valve, and completing said signal circuit.

2. In a hydraulic jacking system for a motor vehicle and in combination, hydraulic jacks carried by the vehicle, a reservoir for containing a liquid for operating said jacks, a pump connected to said reservoir and said jacks and operable to deliver liquid from the reservoir to the jacks under pressure to operate said jacks, a by-pass interconnecting said reservoir and said jacks, a safety valve normally closing said by-pass, said safety valve being automatically opened when the delivered fluid exceeds a predetermined pressure, a release valve connected between said reservoir and the delivery side of the pump for by-passing liquid from said jacks back into said reservoir when said pump is at rest to release said jacks, a clutch operable to connect the pump to the engine drive to operate said pump under control of the running engine, an electrical signalling device operable under control of the engine ignition circuit to notify the operator when the clutch is actuated to connect the pump to the engine drive, and means operable from the dashboard for simultaneously operating said clutch to connect the pump to the engine drive, closing said release valve to cut off by-passing of the jack operating fluid, and completing the electrical circuit for actuating said signalling device.

3. The combination with a motor vehicle, of a hydraulic jacking system therefor comprising hydraulically operated jacks secured to the vehicle axles, a source of jack operating liquid supply, a pump interconnecting said jacks and said supply source and operable to transfer liquid from said reservoir to said jacks under pressure to initiate the jacking operation, a clutch operable to connect the pump to the engine drive, a valve-controlled by-pass between the inlet and outlet sides of the pump, said valve being operable when the pump is declutched to permit the return flow of liquid from said jacks to said reservoir to release said jacks, means manually controllable from the vehicle dashboard to simultaneously initiate closure of said valve and clutching of said pump, a key controlled ignition circuit for the vehicle engine, an electrical signal operable when actuated to warn the driver, and a circuit for said signal prepared in part by the insertion of the key in the ignition circuit and completed when said manually controllable means is operated for actuating said signal.

4. The combination with a motor vehicle, of a hydraulic jacking system therefor comprising hydraulically operated jacks secured to the vehicle axles, a source of jack operating fluid supply, means including a pump having a valve-controlled by-pass between its inlet and outlet sides for controlling the supply of fluid to the jacks via the pump to operate said jacks and the return of the fluid to the reservoir via the by-pass when the valve is open to release said jacks, a clutch operable to connect the pump to the engine drive, a lock controlled socket mechanism accessible to the operator, a cable interconnecting said socket mechanism, said valve and said clutch, said valve being open and said pump declutched when said socket mechanism is locked, said cable being operable responsive to the unlocking the socket mechanism to close said valve and to clutch said pump, a key controlled ignition circuit for the vehicle engine, an electrically operated warning signal, and a circuit for said signal prepared in part by the insertion of the key in the ignition circuit and completed by the unlocking of the socket mechanism for actuating said warning signal.

5. The combination with a motor vehicle, of a hydraulic jacking system therefor comprising hydraulically operated jacks secured to the vehicle axles, a source of jack operating fluid supply, means including a pump having a valve-controlled by-pass between its inlet and outlet sides for controlling the supply of fluid to the jacks via the pump to operate said jacks and the return of the fluid to the reservoir via the by-pass when the valve is open to release said jacks, a clutch operable to connect the pump to the engine drive, a lock controlled plunger mechanism accessible to the operator, a tubing for containing a column of fluid extending from said plunger mechanism to said valve and to said clutch operating controls, said valve being open and said pump declutched when the plunger mechanism is locked, said plunger being operable when unlocked to move said column of fluid in said tubing to cause said valve to be closed and said clutch to be operated to connect said pump to said engine drive, a key controlled ignition circuit for the vehicle engine, an electrically operated warning signal, and a circuit for said signal prepared in part by the insertion of the key in the ignition circuit and completed by the unlocking of the plunger mechanism for actuating said warning signal.

6. A motor vehicle having a driven element, a pump body mounted on the vehicle, a pump spindle, pump devices driven by the spindle for delivering fluid under pressure, a reservoir for liquid, a pipe leading oil from the reservoir to the inlet side of the pump, hydraulically operated lifting jacks permanently attached to the front and rear of the vehicle for raising the wheels of the vehicle off the ground, a release valve for passing the fluid pressure supplied to the jacks back to said reservoir, means whereby the supply of fluid to the jacks ceases when a predetermined pressure is reached, a clutch device for coupling the pump spindle to said driven element and uncoupling said spindle from said element, a low pressure device such as a cable leading from the clutch to a position adjacent to the driver, means whereby the driver can actuate said low pressure device to bring about coupling and uncoupling of the clutch, means connecting the low pressure device with the release valve whereby the release valve is operated simultaneously with the clutch device, an electric circuit including an electric lamp, means for supplying electricity to said circuit, means whereby the circuit is made and broken respectively when the ignition circuit of the vehicle is made and broken, a switch in said circuit, and connections between said switch and said low pressure device for opening and closing the said switch by the movement of the said low pressure device whereby movement of the low pressure device in one direction will simultaneously close the release valve, drive the pump to extend the lifting jacks, and supply current to said lamp.

7. A motor vehicle having a driven element, a pump body mounted on the vehicle, a pump spindle, pump devices driven by the spindle for delivering fluid under pressure, a reservoir for liquid, a pipe leading oil from the reservoir to the inlet side of the pump, hydraulically operated lifting jacks permanently attached to the front and rear of the vehicle for raising all wheels of the vehicle off the ground simultaneously direct from the delivery side of the pump to the jacks, a release valve for passing the fluid pressure supplied to the jacks back to the said reservoir, a safety valve for by-passing fluid from the delivery side of the pump to the inlet side when the pressure exceeds the predetermined value, a clutch device for coupling the pump spindle to the said driven element and uncoupling said spindle from said element, a low pressure device leading from the clutch to a position adjacent to the driver, means whereby the driver can actuate the said low pressure device to bring about coupling and uncoupling of the clutch, means connecting the low pressure device with the release valve whereby the release valve is operated simultaneously with the clutch device, an electric circuit, an electric lamp in said circuit, means for supplying electricity to said circuit, means whereby the circuit is made and broken respectively when the ignition circuit of the vehicle is made and broken, a switch in said circuit, and connections between said switch and said low pressure device for opening and closing the said switch by the movement of the said low pressure device whereby movement of the low pressure device in one direction will simultaneously close the release valve, drive the pump to extend the lifting jacks and supply current to the said lamp.

8. A motor vehicle having a driven element, a pump body mounted on the vehicle, a pump spindle, pump devices driven by the spindle for delivering fluid under pressure, a reservoir for liquid, a pipe leading oil from the reservoir to the inlet side of the pump, hydraulically operated lifting jacks permanently attached to the front and rear of the vehicle for raising all wheels of the vehicle off the ground simultaneously direct from the delivery side of the pump to the jacks, a release valve for passing the fluid pressure supplied to the jacks back to the said reservoir, means whereby the supply of fluid to the jacks ceases when a predetermined pressure is reached, a clutch device for coupling the pump spindle to the said driven element and uncoupling said spindle from said element, a low pressure device leading from the clutch to a position adjacent to the driver, means whereby the driver can actuate the said low pressure device to bring about coupling and uncoupling of the clutch, means connecting the low pressure device with the release valve whereby the release valve is operated simultaneously with the clutch device, an electric circuit, an electric lamp in said circuit, means for supplying electricity to said circuit, means whereby the circuit is made and broken respectively when the ignition circuit of the vehicle is made and broken, a switch in said circuit, and connections between said switch and said low pressure device for opening and closing the said switch by the movement of the said low pressure device whereby movement of the low pressure device in one direction will simultaneously close the release valve, drive the pump to extend the lifting jacks and supply current to the said lamp.

DONALD WILFRED SESSIONS.